United States Patent [19]

Goss

[11] Patent Number: 5,050,026
[45] Date of Patent: Sep. 17, 1991

[54] VERTICAL FLAT COIL FOR HEAD ACTUATOR

[75] Inventor: Lloyd C. Goss, Bloomington, Minn.

[73] Assignee: Magnetic Peripherals Inc., Minneapolis, Minn.

[21] Appl. No.: 634,975

[22] Filed: Jan. 7, 1991

Related U.S. Application Data

[63] Continuation of Ser. No. 451,200, Dec. 15, 1989, abandoned.

[51] Int. Cl.$^5$ .............................................. G11B 5/55
[52] U.S. Cl. .................................. 360/106; 360/98.01
[58] Field of Search ................. 360/104, 105, 106, 109

[56] References Cited

U.S. PATENT DOCUMENTS

| | | |
|---|---|---|
| 4,775,908 | 10/1988 | Yeas . |
| 4,805,055 | 2/1989 | Wright . |
| 4,835,643 | 5/1989 | Schulze . |
| 4,879,617 | 11/1989 | Sampietro et al. ................. 360/106 |
| 4,881,139 | 11/1989 | Hazebrouck ........................ 360/105 |
| 4,941,062 | 7/1990 | Yoshioka ............................ 360/106 |
| 4,949,206 | 8/1990 | Phillips et al. ..................... 360/106 |

FOREIGN PATENT DOCUMENTS 62-271267 11/1987 Japan .

Primary Examiner—A. J. Heinz
Assistant Examiner—Jefferson Evans
Attorney, Agent, or Firm—Haugen and Nikolai

[57] ABSTRACT

A rotary actuator for a magnetic disc drive includes a stationary arcuate permanent magnet and a thin, arcuate voice coil formed of a single winding of aluminum wire. Both the magnet and voice coil are curved about a pivot axis of a rotating shaft supporting a movable head arm assembly of the rotary actuator. The coil is integral with the head arm assembly, and pivots the head arm assembly responsive to electrical current introduced into the coil. Opposite ends of the pivot shaft are received into fixed race bearings supported by spaced apart upper and lower bearing plates, one of which is slightly elastically deformed to secure the shaft by their restoring force. Leaf springs provide a biasing force against the selected bearing plate and cooperate with parallel, spaced apart flexure members in the selected bearing plate to compensate for thermal expansion coefficient mismatch.

19 Claims, 4 Drawing Sheets

VERTICAL FLAT COIL FOR HEAD ACTUATOR

This is a continuation of copending application Ser. No. 07/451,200, filed on Dec. 15, 1989, now abandoned.

BACKGROUND OF THE INVENTION

The present invention relates to magnetic disc drive data storage devices, and more particularly to rotary actuators employed in such devices to selectively position magnetic transducing heads relative to rotating discs.

Magnetic disc drive devices generally employ either linear or rotary actuators to position magnetic reading and recording heads with respect to rotatable magnetic discs. Such heads typically are moved at least generally radially of the discs in order to locate a head proximate a desired track on the disc.

Rotary actuators usually include a shaft mounted rotatably on the deck or other stationary housing portion of the drive, along with an arm or group of stacked arms connected to the shaft for pivoting with the shaft. A magnetic transducing head is mounted to the end of each arm remote from the shaft, and thus is carried in an arcuate path as the shaft pivots. Usually, multiple head support arms are mounted to the shaft in stacked relation, for rotation in concert with the shaft.

The prevailing means for controllably pivoting the head arm assembly is an electric motor including a voice coil and permanent magnets. Typically the voice coil is a flat loop perpendicular to the shaft pivot axis, connected to the shaft for pivoting with the shaft. The permanent magnets then are integral with the disc drive housing, positioned in spaced apart relation to the voice coil and on opposite sides of the coil. When electrical current is directed through the wires of the voice coil, a magnetic field is generated which interacts with the magnetic field of the permanent magnet to provide the force which moves the voice coil and rotates the shaft as well.

This orientation of the voice coil, however, gives rise to a problem in that only the radially outward portion of the voice coil has a desirably long moment arm, i.e. distance from the pivot axis. The radially inward portions of the coil have shorter effective moment arms, and thus provide correspondingly reduced rotational force on the shaft and head arm assembly. Of course, this difficulty can be counteracted by increasing the size of the voice coil, yet such a "solution" runs contrary to the continuing trend toward smaller and more compact disc drive components, including rotary actuators. Large voice coils further are a disadvantage in that they add to the inertia of the shaft and head arm assembly, resulting in a head arm assembly which cannot be accelerated and decelerated as rapidly as desired, or conversely require increased power to accelerate and decelerate the assembly.

Another challenge associated with rotary actuators is the desire to employ lightweight materials, e.g. aluminum, to the extent possible to further reduce inertia of the head arm assembly, as well as reducing overall weight. At the same time, other necessary structure, e.g. flux carrying bodies constructed of steel, have different thermal expansion coefficients and thus raise the potential for distortion due to the varying thermal coefficients of contiguous structures in the actuator.

Therefore, it is an object of the present invention to provide a rotary actuator in which substantially the entire voice coil is located at a constant radial separation from the rotary actuator pivot shaft.

Another object is to provide a voice coil curved about the pivot axis of a rotary actuator, and having a thickness dimension radially of the pivot axis selected to facilitate rapid dissipation of heat from the voice coil.

A further object is to provide a voice coil of reduced mass for reduced inertia of a head arm assembly of a rotary actuator, at no reduction in available power to accelerate and decelerate the head arm assembly.

Yet another object is to provide a rotary actuator including means to compensate for different thermal expansion coefficients in various materials employed in constructing the actuator.

SUMMARY OF THE INVENTION

To achieve these and other objects, there is provided a disc drive having a stationary frame, a data storage disc mounted rotatably relative to the frame, a magnetic transducing head for storing data onto the disc and for retrieving data previously stored onto the disc, and a rotary actuator for controllably positioning the transducing head relative to a disc.

The rotary actuator includes a longitudinally extended shaft, and means for supporting the shaft with respect to the frame, to pivot relative to the frame about a longitudinal pivot axis. A transducer support arm means is integrally mounted to the shaft for rotation with the shaft, and extends away from the shaft in a first radial direction. At least one magnetic transducing head is mounted to the support arm means at an end portion thereof remote from the shaft, for travel in an arcuate path as the shaft rotates. A permanent magnet means is fixedly mounted to the frame and spaced apart from the shaft. The magnet means has a convex magnet face directed toward the shaft and curved about the longitudinal axis. A coil support means is integrally mounted to the shaft and extends away from the shaft in a second radial direction. An electrically conductive coil is mounted to the coil support means for arcuate travel about the longitudinal axis as the shaft rotates. The coil has a substantially uniform thickness in the radial direction, and is curved about the longitudinal axis to conform to the curvature of the magnet face. The coil is disposed radially inwardly of the magnet face, and has a longitudinal dimension and a width dimension, each of which is at least five times the thickness.

Preferably the coil winding is formed of a single aluminum wire, with the thickness of the coil winding determined by the diameter of the wire. The coil can be generally rectangular, including a pair of opposed longitudinal side portions and a pair of opposite and arcuate end portions, combining to form a thin, rectangular coil frame.

Because the radial dimension of the coil is its relatively small thickness, substantially all of the coil has the same moment arm or lever arm, i.e. is the same distance from the pivot axis. This arrangement enhances the performance of the rotary actuator in achieving more consistent and reliable performance, and also in providing the desired level of force to rotate the head arm assembly with a coil substantially smaller in size as compared to a conventional coil with a major dimension in the radial direction. The smaller coil reduces the inertia of the assembly for more rapid acceleration and deceleration, leading to reduced time for gaining access to particular data tracks on the discs, lower power requirements, or both. This arrangement further requires only about half the permanent magnet volume required in connection with a perpendicular or radially disposed coil.

In accordance with a further aspect of the invention, the means for supporting the actuator shaft include first and second transverse bearing plates spaced apart from one another, and first and second bearings supported in the first and second bearing plates, respectively, for receiving opposite ends of the actuator shaft. One of the bearing plates incorporates a parallelogram flexure between the fixed end of the plate and the bearing support. This flexure provides a means of axially preloading the pair of bearings. This axial preload secures the shaft position. A substantially rigid spacing means is secured to the bearing plates and maintains their spaced apart relationship. A biasing means, mounted to the spacing means, contacts the flexible bearing plate, provides a bias to move the associated bearing longitudinally away from the other bearing.

Preferably the biasing means comprises a pair of leaf springs in contact with the flexible plate. The leaf springs provide a biasing force in the direction to axially preload the bearings in a direction away from each other. This compensates for thermal expansion effects due to the use of aluminum in the biasing plates, contiguous with pole pieces of a low carbon steel, provided for transfer of magnetic flux. This thermal compensation structure enables the use of fixed races in the bearings, for a more reliable mounting of the pivot shaft.

To provide the parallelogram flexure, a portion of the bearing plate contacting the leaf springs is cut away to form parallel flexure means or load beams. Performance is enhanced further by the insertion of damping material between the flexure load beams.

Thus, in accordance with the present invention, a thin voice coil, with its major dimensions perpendicular to the radius of the actuator pivot shaft, can be provided in a substantially reduced size yet provide the same level of force to accelerate and decelerate the head arm assembly. The thin, single winding (rather than bobbin) structure promotes rapid heat dissipation from the coil. The reduced size coil lowers the inertia of the head arm assembly, thus to further reduce power requirements.

IN THE DRAWINGS

For a further understanding of the above and other features and advantages, reference is made to the following detailed description and to the drawings in which.

DETAILED DESCRIPTION OF THE PREFERRED EMBODIMENT

Figure 1:
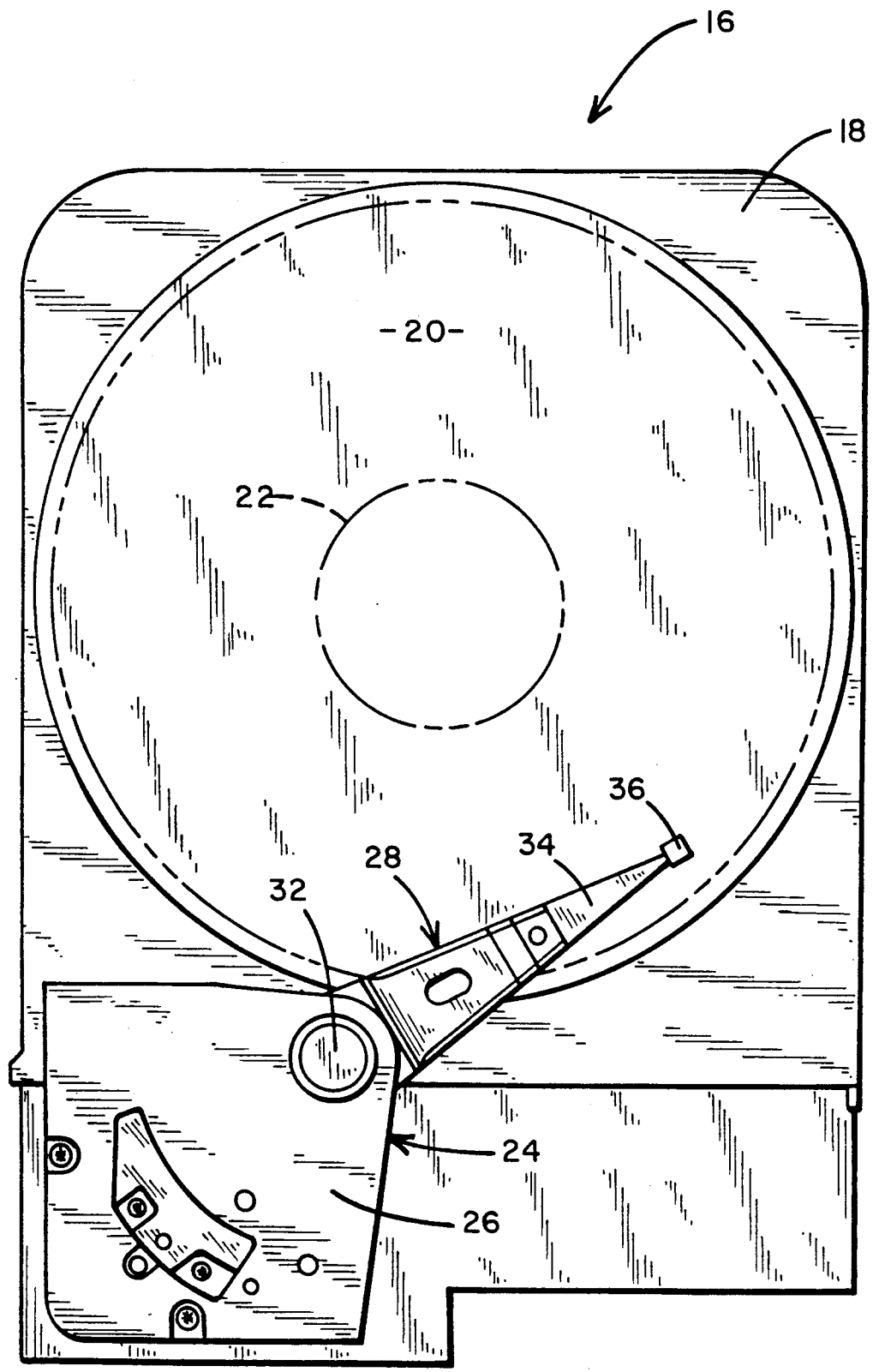
FIG. 1 is a top plan view of a magnetic disc drive including a rotary actuator constructed in accordance with the present invention.

Turning now to the drawings, there is shown in FIG. 1 a magnetic disc drive 16 including a deck 18 which is part of a stationary framework or housing for the disc drive. A stack of magnetic data storage discs, the top one being shown at 20, is rotatably mounted relative to the deck through a spindle 22. Also mounted on deck 18 is a rotary actuator assembly 24, including a portion 26 which is fixed to the deck, and a head arm assembly 28 which is movable relative to the deck. More particularly, head arm assembly 28 can be pivoted with respect to the deck about a longitudinal axis 30 of a longitudinal (i.e. vertical) actuator shaft 32. The head arm assembly includes a stack of multiple transducer support arms, the top one being shown at 34. A magnetic transducing head 36 is supported at the free end of arm 34, remote from the actuator shaft, whereby transducing head 36 traverses an arcuate path as shaft 32 pivots.

Figure 2:
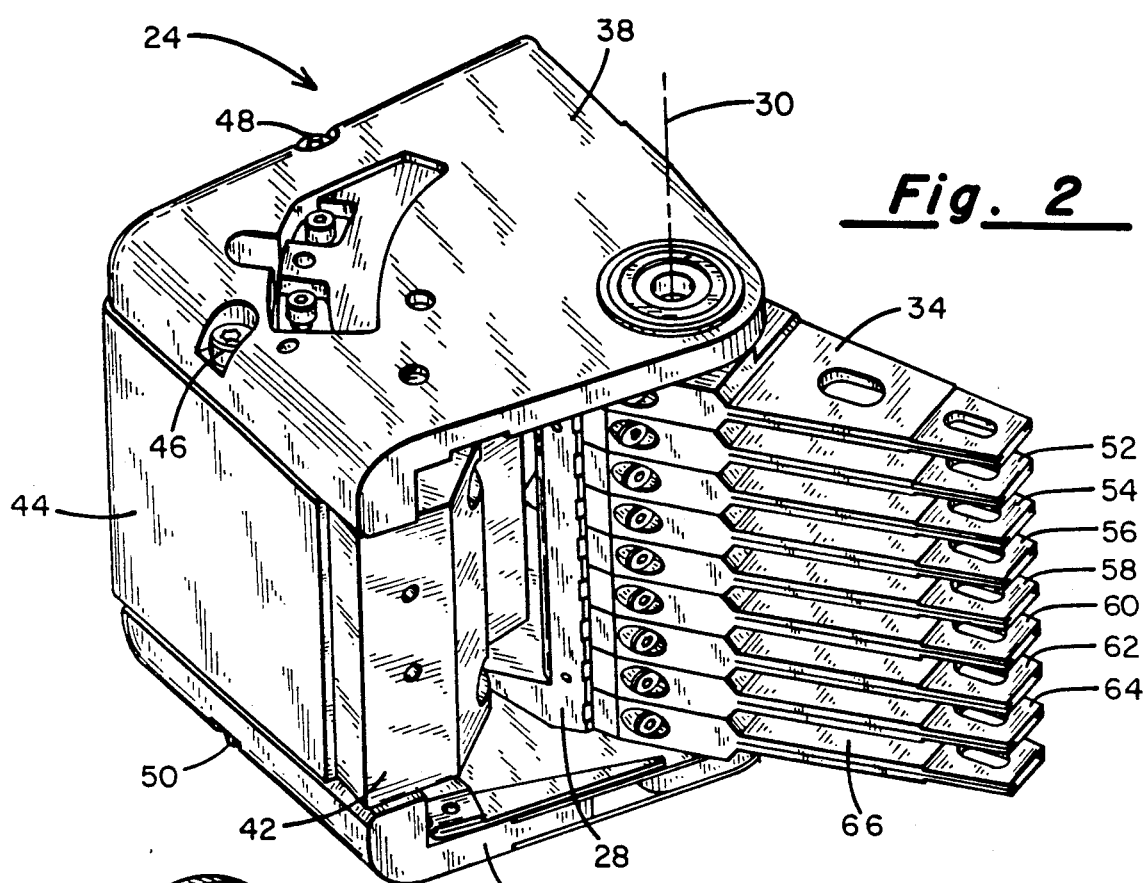
FIG. 2 is a perspective view of the actuator assembly.

FIG. 2 shows actuator assembly 24 removed from the disc drive. The fixed or stationary portion of the actuator assembly includes a pair of generally transverse or horizontal bearing plates constructed of aluminum, in particular an upper bearing plate 38, and a lower bearing plate 40 secured to deck 18. An aluminum pole piece support bracket 42 is secured to bearing plates 38 and 40. The bearing plates also are secured to a pole piece 44, e.g. by fasteners at 46, 48 and 50. The pole piece preferably is constructed of a low carbon steel, and acts as a spacer to maintain the separation between the bearing plates.

Head arm assembly 28 includes a plurality of transducer support arms 52-66 along with top arm 34, all integral with actuator shaft 32 and thus rotating in concert as the shaft pivots.

Figure 3:
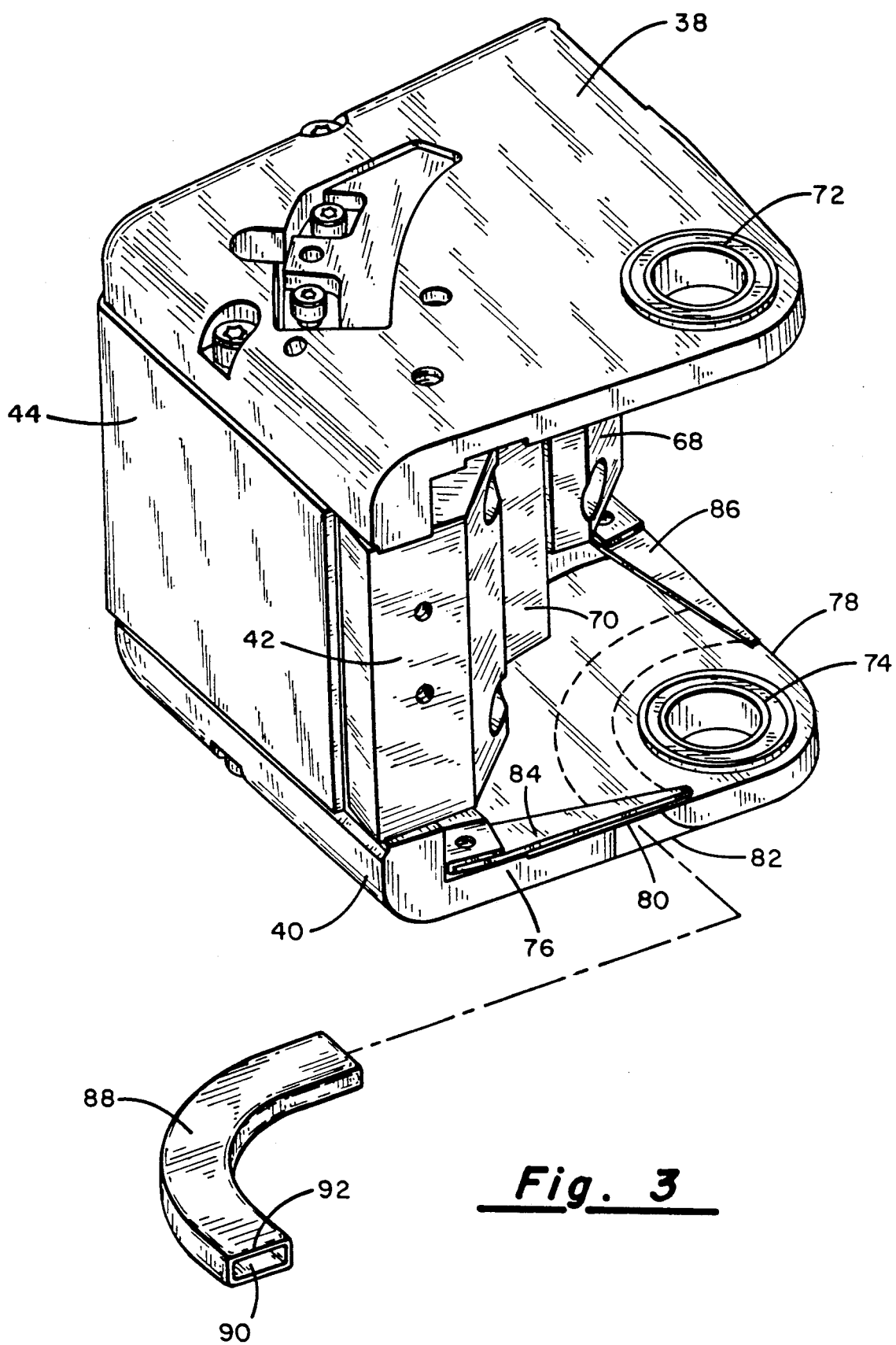
FIG. 3 is a perspective view of the actuator assembly with a pivot shaft and head arm assembly removed.

In FIG. 3, the head arm assembly is removed from the remainder of actuator assembly 24, to reveal a pole piece support bracket 68 which cooperates with bracket 42 in determining the location of a pole piece 70 situated between brackets.

Upper and lower bearings 72 and 74 are supported by bearing plates 38 and 40, respectively, and support opposite ends of actuator pivot shaft 32 to enable shaft rotation. The vertical or longitudinal separation of bearings 72 and 74 is predetermined with respect to the actuator shaft length such that one of the bearing plates are at least slightly elastically deformed when shaft 3 is supported between them. The biasing springs 84 and 86 provide the main axial bearing preload. Thus, the bearings provide a restoring force which secures the actuator shaft position.

The races of bearings 72 and 74 are fixed. This, in combination with the simultaneous use of aluminum and low carbon steel as noted above, creates a need for thermal compensation, in particular due to the different thermal expansion coefficients for aluminum and low carbon steel. To this end, an arcuate cutout is formed in bearing plate 40 from a side edge 76 to another side edge 78 as indicated in broken lines, forming upper and lower parallel flexure members or load beams 80 and 82. A leaf spring 84 is secured to bearing plate 40 and is preloaded to provide a downward bias to bearing plate 40 along edge 76. Likewise, a leaf spring 86, mounted to plate 40, downwardly biases the bearing plate along edge 78. In combination, leaf springs 84 and 86 along with load beams 80 and 82 compensate for the thermal mismatch, and impart excellent thermal performance characteristics to the rotary actuator.

To overcome undesirable resonance effects, an arcuate damping member 88 having an aluminum core 90 surrounded by a viscoelastic damping layer 92 is inserted into the arcuate opening between load beams 80 and 82.

Figure 4:
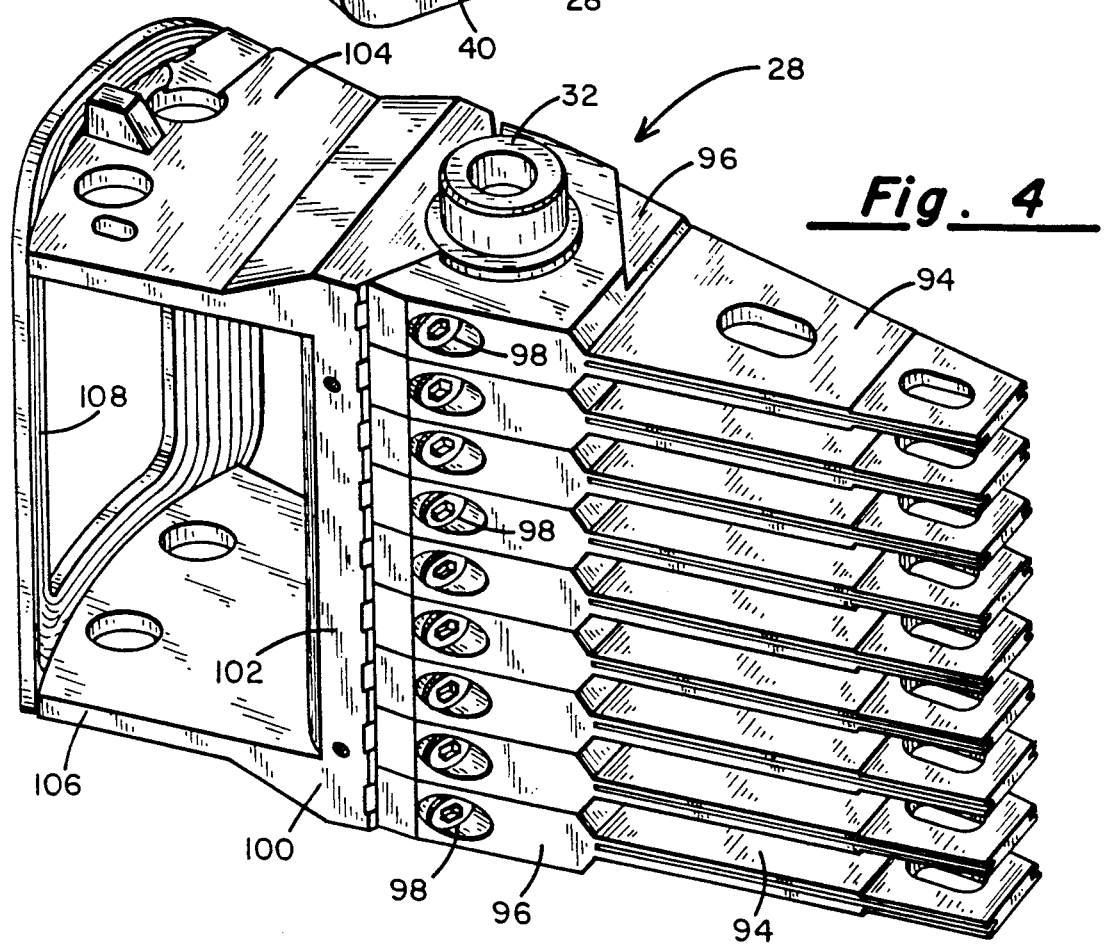
FIG. 4 is a perspective view of the pivot shaft and head arm assembly.

The head arm assembly is illustrated in FIG. 4. Transducer support arms 34 and 52-66 are substantially identical. Arm 34, for example, includes a relatively thin tapered portion 94 extended radially of a relatively thick base 96. A fastener 98, and a similar fastener on the other side and thus not visible in the figure, secure base 96 to a voice coil carrying frame 100. Arms 52-66 similarly include tapered extensions and bases, likewise secured to the coil carrying frame. With actuator pivot shaft 32 positioned between the bases and an upright support portion 102 of the frame, fasteners 98 secure the arms and the frame integrally to the actuator pivot shaft. Upper and lower flanges 104 and 106 of frame 100 extend radially away from shaft 32, in a direction opposite to that of arm extension, thus to counter-balance the transducer support arms. A voice coil 108 is secured at its upper and lower end portions to flanges 104 and 106, and thus traverses an arcuate path when shaft 32 pivots. Preferably the entire assembly including shaft 32, the arms, frame 100 and voice coil 108, is constructed of aluminum. This reduces the differential thermal expansions of this assembly, enabling more accurate location of the recording heads with respect to the magnetic tracks located on the discs.

Figure 5:
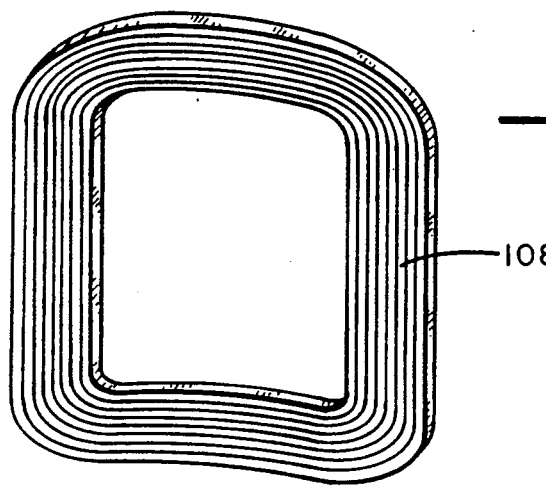
FIG. 5 is a perspective view of a voice coil of the head arm assembly.

As seen in FIG. 5, voice coil 108 forms a thin, rectangular frame. The voice coil is generally flat, but more precisely is curved about longitudinal axis 30. The frame is formed of multiple windings (preferably over 100) of a rectangular cross section aluminum wire. The windings themselves form the voice coil frame, there being no core about which the wire is wound, for example as in the well-known bobbin approach.

The longitudinal dimension and width (or arcuate) dimension of voice coil 108 are preferably an order of magnitude greater than the coil thickness, and in any event should be at least five times the thickness. As a result, voice coil 108 can be considered as contained within a thin wall of a circular upright cylinder, concentric on axis 30, with the moment arm or lever arm of the coil being equal to the cylinder radius. Accordingly, virtually the entire voice coil has the same moment arm. With the wire winding alone forming the coil (no core), voice coil 108 can be as thin as the wire dimensions, and have longitudinal and arcuate dimensions determined by the number of windings.

Figure 6:
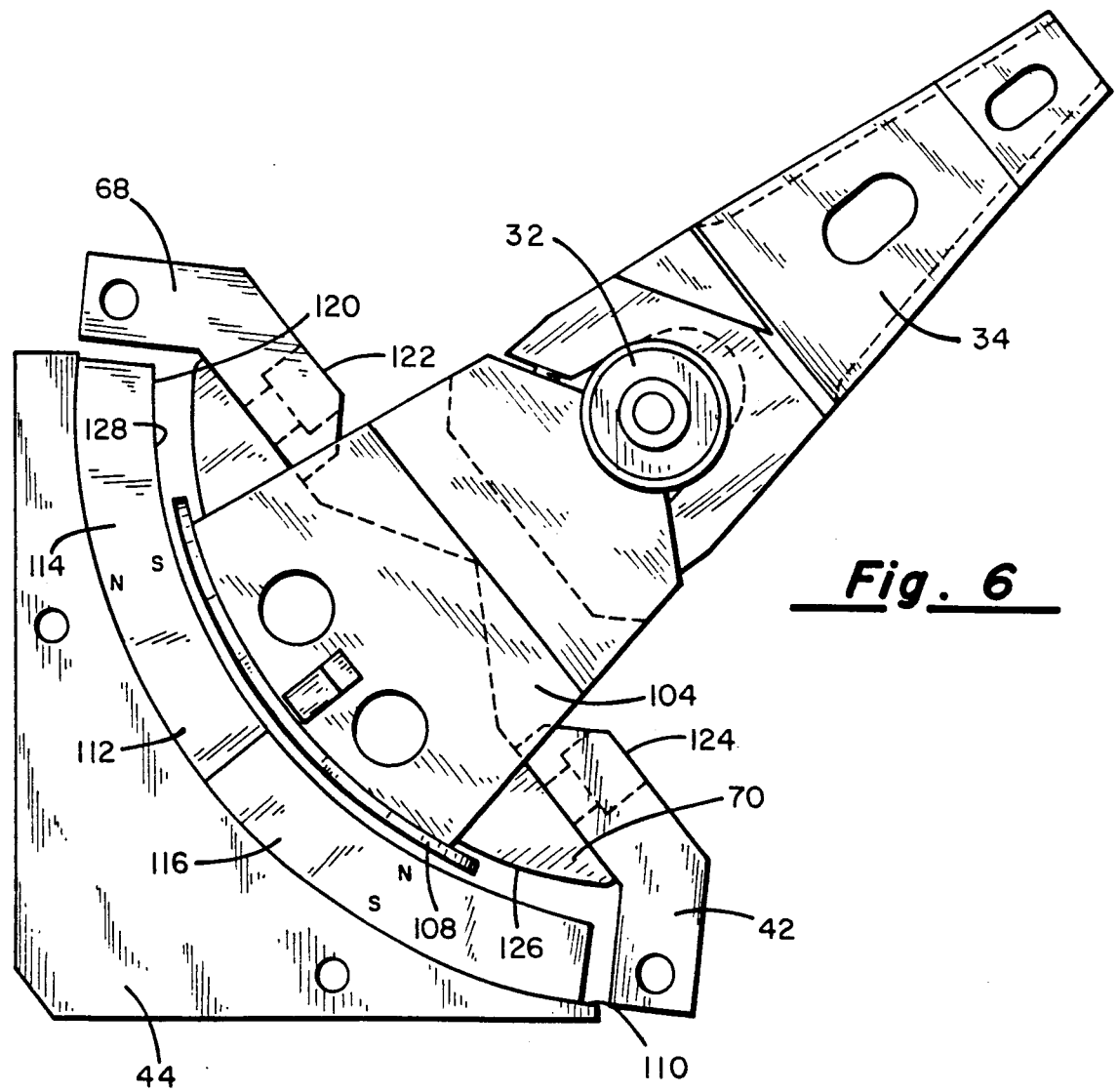
FIG. 6 is a top plan view of portions of the actuator assembly.

As seen in FIG. 6, pole piece 44 includes a radially inward surface 110 curved about axis 30. A permanent magnet assembly 112, including magnets 114 and 116, is secured to pole piece 44. Magnets 114 and 116 are arcuate, curved about the pivot axis and thus conform to surface 110 of pole piece 44. This facilitates a mounting of magnets 114 and 116 to the pole piece, with radially outward faces of the magnets contiguous with surface 110. A radially inward surface 120 of the magnet assembly likewise is curved about the pivot axis.

Pole piece 70 is fixed with respect to and radially inward of pole piece 44. Pole piece 70 is situated between and spaced apart from flanges 104 and 106 to permit movement of the head arm assembly. More particularly, fasteners as indicated at 122 and 124 secure pole piece 70 to brackets 42 and 68. A radially outward surface 126 of pole piece 70 is curved about the longitudinal axis, and thus cooperates with surface 120 of magnet assembly 112 to form an arcuate, longitudinal air gap 128 between the magnet and the radially inward pole piece. Coil 108 is situated within air gap 26, preferably radially centered.

Rotary actuator 24 functions in a well-known manner. When electric current is supplied to voice coil 108, a magnetic field is generated about the voice coil that interacts with the magnetic field about permanent magnet assembly 112. The force of the interacting magnetic fields moves voice coil 108 relative to the permanent magnet assembly, thus to pivot shaft 32 and the head arm assembly, which in turn moves magnetic transducing head 36 and the remaining heads in arcuate paths. Thus, each of the transducing heads is movable generally radially of its associated one of the magnetic discs, which, in combination with disc rotation, enables the selected head positioning necessary for recording and retrieving data.

As compared to a conventional horizontal voice coil orientation, the vertical flat coil substantially reduces the time required for accelerations and decelerations of the head arm assembly through reduced actuator inertia, requires less power, and substantially reduces voice coil temperature due to markedly improved heat dissipation. This approach has been found to reduce the required permanent magnet volume by nearly fifty percent. Further reduction in inertia results from the use of aluminum throughout the head arm assembly and for much of the remainder of the actuator assembly. Fixed race ball bearings can be employed to secure the pivot shaft, in spite of the different materials involved, due to the leaf springs and parallel load beams, which compensate for differences in thermal expansion coefficients.

I claim:

1. In a disc drive having a stationary frame, a magnetic disc mounted with respect to the frame for rotation relative to the frame, a magnetic transducing head for storing data onto the disc and for retrieving data previously stored on the disc, a rotary actuator for controllably positioning the head with respect to the disc; said rotary actuator assembly including:

a longitudinally extended actuator shaft, and means for supporting the shaft with respect to the frame to pivot relative to the frame about a longitudinal pivot axis;

a transducer support arm means integrally mounted to the shaft for rotation therewith, said transducer support arm means extending away from the shaft in a first radial direction, and at least one magnetic transducing head mounted to the support arm means at an end portion thereof remote from the shaft, for travel in an arcuate path as the shaft rotates;

a permanent magnet assembly mounted to the frame in spaced apart relation to the shaft, said magnet assembly having a concave magnet face directed toward the shaft and curved about the pivot axis;

a coil support means integrally mounted to the shaft and extended away from the shaft in a second radial direction; and an electrically conductive voice coil mounted to the coil support means for arcuate travel about the pivot axis as the actuator shaft pivots, said voice coil having a uniform thickness radially and being disposed radially inwardly of the magnet face, said coil being curved about the pivot axis to conform to the curvature of the magnet face, and with the longitudinal and circumferential width dimensions of said voice coil each being at least five times in magnitude larger than the radial thickness dimension of the voice coil.

2. The rotary actuator of claim 1 wherein:

the longitudinal and width dimensions of the voice coil are each at least an order of magnitude greater than the coil thickness.

3. The rotary actuator of claim 2 wherein:
the voice coil comprises a generally rectangular frame including two longitudinal portions members and two arcuate end portions joined to the side portions.

4. The rotary actuator of claim 3 wherein:
said voice coil is formed of a single rectangular cross-section wire, with the thickness dimension determined by the dimension of the wire and the longitudinal and width dimensions determined by the number of turns of the wire.

5. The rotary actuator of claim 4 wherein:
said wire is aluminum.

6. The rotary actuator of claim 2 wherein:
the length dimension is at least twice the width dimension.

7. The rotary actuator of claim 1 wherein:
said means for supporting the pivot shaft include first and second transverse bearing plates longitudinally spaced apart from one another, and first and second bearings supported in said first and second bearing plates, respectively, for rotatably receiving opposite end portions of the pivot shaft.

8. The rotary actuator of claim 7 wherein:
one of the bearing plates is elastically deformed in a direction away from the other bearing plate when supporting the shaft, thereby to provide a restoring force to secure the pivot shaft.

9. The rotary actuator of claim 8 wherein:
said means for supporting the pivot shaft further include a substantially rigid spacing means secured to said bearing plate and maintaining the bearing plates in said longitudinally spaced apart relation, and a biasing means contacting at least one of said bearing plates, thereby to move the associated bearing in a direction away from the other bearing plate.

10. The rotary actuator of claim 9 wherein:
said associated bearing plate includes first and second parallel flexure members defining an arcuate opening through the associated bearing plate.

11. The rotary actuator of claim 10 further including:
an arcuate damping member inserted into said arcuate opening and contiguous with the flexure members.

12. The rotary actuator of claim 1 further including:
a first magnetic flux conducting body integral with the frame and positioned radially outwardly of the permanent magnet assembly, and a second magnetic flux conducting body radially inwardly of the permanent magnet assembly, said second body including a radially outward surface curved about said pivot axis and cooperating with said magnet face to form an arcuate air gap within which the voice coil travels in its arcuate path.

13. A rotary actuator for controllably positioning a magnetic transducing head with respect to a rotatable magnetic disc; including:
a stationary actuator portion including a permanent magnet assembly; and a head arm assembly mounted for pivoting about a longitudinal axis relative to the stationary actuator portion, said head arm assembly including a transducer support arm extending radially of the longitudinal axis and a magnetic transducing head supported on the transducer support arm at a location remote from the longitudinal axis; said permanent magnet assembly having a magnet face parallel to the longitudinal axis and curved about the longitudinal axis; and
an electrically conductive voice coil integral with the head arm assembly and disposed for arcuate travel about the longitudinal axis as the head arm assembly pivots, said voice coil being curved about the longitudinal axis and having a longitudinally extending coil surface spaced apart from the magnet face and substantially conforming to the curvature of the magnet face, said coil having a thickness in a direction radially of the longitudinal axis, a longitudinal dimension and a circumferential width dimension, each of said longitudinal and width dimensions being substantially greater than said thickness.

14. The rotary actuator of claim 13 wherein:
each of said longitudinal and width dimensions is at least five times the thickness.

15. The rotary actuator of claim 13 wherein:
each of the longitudinal and width dimensions is at least an order of magnitude greater than the thickness.

16. The rotary actuator of claim 13 wherein:
the voice coil comprises a generally rectangular frame including two longitudinal side portions defining said coil surface.

17. The rotary actuator of claim 13 wherein:
the voice coil is formed of a single wire having a rectangular cross section, wherein the thickness of the voice coil is determined by the cross section of the wire, and the longitudinal and circumferential width dimensions are determined by the number of turns of the wire.

18. The rotary actuator of claim 13 wherein:
said stationary actuator portion further includes two magnetic flux conducting bodies, one of the flux conducting bodies supporting the permanent magnet assembly, the other magnetic flux conducting body cooperating with the magnet assembly to form and arcuate air gap to accommodate the arcuate travel of the voice coil.

19. The rotary actuator of claim 13 wherein:
said permanent magnet assembly comprises a pair arcuate permanent magnets adjacent one another.

* * * * *

UNITED STATES PATENT AND TRADEMARK OFFICE
CERTIFICATE OF CORRECTION

PATENT NO. : 5,050,026

DATED : September 17, 1991

INVENTOR(S) : Lloyd C. Goss

It is certified that error appears in the above-identified patent and that said Letters Patent is hereby corrected as shown below:

Column 7, Claim 3, Line 6, after the word "longitudinal" insert -- side --.

Column 7, Claim 3, Line 6, the word "members" should be deleted.

Column 7, Claim 9, Line 35, the word "plate" should read as -- plates --.

Signed and Sealed this

Twelfth Day of January, 1993

Attest:

DOUGLAS B. COMER

*Attesting Officer*   Acting Commissioner of Patents and Trademarks